Patented Feb. 12, 1952

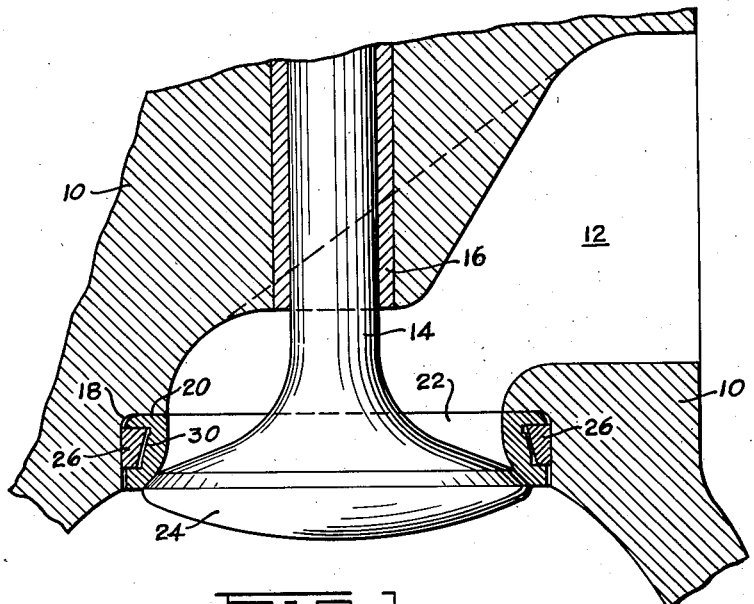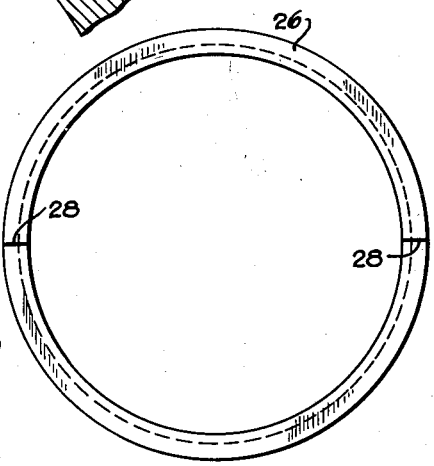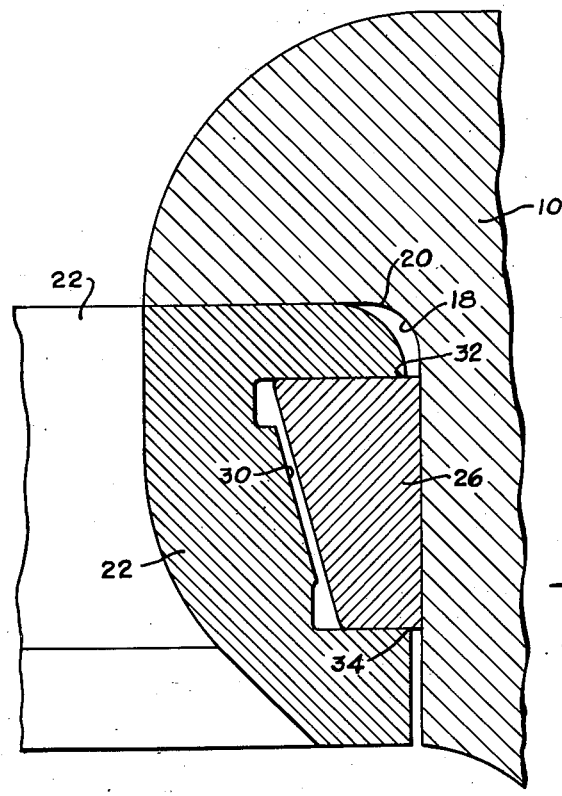

2,585,658

UNITED STATES PATENT OFFICE 2,585,658

VALVE SEAT INSERT

George H. Keller, Radburn, N. J., assignor to Curtiss-Wright Corporation, a corporation of Delaware Application July 11, 1947, Serial No. 760,443

9 Claims. (Cl. 251—167)

This invention relates to valve seats and is particularly directed to valve seat inserts for the valves of an internal combustion engine.

The cylinders, cylinder heads, and/or cylinder blocks of an internal combustion engine become quite hot during engine operation. Actually this structure heats up unevenly, probably because the exhaust gases of each cylinder discharge through a non-symmetrically disposed valve port in its cylinder head and/or cylinder block. As a result the valves and the material of the cylinder heads and/or cylinder blocks about the valve ports do not expand uniformly as the engine heats up so that if the valve seats are rigid with the cylinder heads and/or cylinder blocks they will distort from their original circular condition. This distortion of the valve seats prevents proper seating of the engine valves.

It is an object of this invention to provide a new and improved valve seat insert capable of conforming to the shape of the valve head even though the support for the valve seat insert distorts into an out-of-round condition.

Other objects of the invention will become apparent upon reading the annexed detailed description in connection with the drawing in which:

Figure 1 is a sectional view through a cylinder head valve port having a valve seat insert assembly embodying the invention;

Figure 2 is an enlarged view of a portion of Figure 1; and

Figure 3 is an elevational view of the retainer ring of said assembly.

Referring to the drawing, a portion of a cylinder head, indicated at 10, is provided with a valve port 12 and a valve 14 slidable in a valve guide 16. The valve port is provided with a counter-bore 18 having a flat bottom 20 and within which an annular valve seat member 22 is secured. The valve 14 is provided with a valve head 24 for cooperation with the valve seat member 22.

The annular valve seat member 22 is secured in place within the counter-bore 18 by a two-part retainer ring 26 having flat axially spaced side walls, said valve seat member and retainer ring forming a valve seat assembly adapted to be inserted within the counter-bore 18. The retainer ring 26 is split as indicated at 28 into two semi-circular halves and the ring is adapted to be tightly received within an external annular groove 30 in the valve seat member 22, said groove 30 having axially spaced flat side walls tightly engaged by the flat sides of the ring 26.

Accordingly the axial width of the retaining ring is made slightly wider than the groove 30 within which the ring is to be placed.

The extent to which the width of the retainer ring 26 is made to exceed that of the groove 30 depends on such factors as the material of said ring and valve seat member 22 and their operating temperatures. Thus the material of said retainer ring and insert member should not be stressed beyond their yield points when the retainer ring 26 is disposed within the groove 30. In addition the fit between the retainer ring 26 and groove 30 of the valve seat member 22 should remain tight at operating engine temperatures even though the valve seat member runs at a higher temperature, and therefore probably expands, relative to the retainer ring. For example, in a modern high power aircraft engine in which each valve seat member groove 30 had an axial width of $\frac{3}{32}$ inches and each valve seat member 22 and its retainer ring 26 were made from a steel alloy conforming to aeronautical materials specification No. 5700, published by the Society of Automotive Engineers, it was found satisfactory to make the axial width of the retainer ring approximately .0002 to .0006 inches (preferably .0004 inches) larger than said groove width. That is the axial width of the retainer ring 26 was made from .07 to .28 percent larger than the axial width of the groove 30. Obviously these percentages may vary with the particular heat and corrosion resistant alloy used for the retainer ring 26 and with that used for the valve seat member 22 as well as with other factors.

After the two-part retainer ring 26 is forced into the groove 30, this valve seat insert assembly is inserted within and secured to the cylinder head 10, within its counter-bore 18, by a shrink fit between the retainer ring 26 and the cylinder head 10. To this end, the retainer ring is made so that, when its two halves are tightly pressed together, the outer diameter of said ring is slightly larger than the internal diameter of the counter-bore 18. For example with the counter-bore 18 having a diameter of approximately 3 inches, the outer diameter of the retainer ring 26 is approximately .01 inch larger than said counter-bore prior to insertion of said ring within said cylinder head and while said ring and cylinder head are at the same temperature.

In order to secure the valve seat assembly to the cylinder head, said assembly is cooled and/or the cylinder head is heated to provide the necessary temperature difference so that the external diameter of the retainer ring becomes less than the internal diameter of the cylinder head counter-bore 18. Thereupon the valve seat insert assembly is inserted into and tightly against the flat bottom 20 of the counter-bore 18. Then said temperature difference is removed, whereupon the retainer ring 26 and the adjacent wall of the counter-bore 18 shrink tightly together and the retainer ring 26 holds the valve seat member 22 tightly against the bottom 20 of the counter-bore 18.

The internal diameter of the retainer ring 26 is larger than the diameter of the bottom of the external groove 30 in the valve seat member 22, thereby providing relative radial clearance between these parts. In addition the outer diameter of the retainer ring 26 is larger than the adjacent external diameter of the valve seat member 22 by an amount which preferably is equal to or larger than this clearnace. The amount of this clearance is not critical and, for example, may be about .02 inch before shinking the valve seat member and retainer ring within the counter-bore 18. Because of this radial clearance and since the engaging surfaces of the retaining ring 26 and valve seat member 22 are flat, said valve seat member can shift radially relative to said retaining ring and cylinder head 10. Accordingly the valve seat member 22 does not have to conform to the shape of the counter-bore 18 and instead said valve seat member is free to conform to the shape of the valve head 24. Thus, as the engine heats up, if the cylinder head 10 distorts its counter-bore 18 to an out-of-round condition, the shrink-fit between the retainer ring 26 and said cylinder head will force the retainer ring to assume the same out-of-round condition. However, because of the radial clearance between the valve seat member 22 and retainer ring 26, this distortion is not transmitted to said valve seat member. Also, if the valve head 24 distorts to an out-of-round condition, the radial clearance between its valve seat member 22 and retainer ring 26, permits the valve head 24 upon engagement with its valve seat member, to force said valve seat member to conform to the shape of the valve head. In addition, if, as a result of distortion of the cylinder head, the valve guide 16 should shift relative to the axis of the counter-bore 18, the valve seat member 22 is free to shift axially, upon engagement by the valve head 24, so as to center the valve seat member relative to the valve guide 16.

One of the difficulties with prior art valve seat member and retainer ring assemblies, having radial clearance therebetween, has resulted from leakage of combustion gases between the valve seat member and its retainer ring, whereby carbon deposits built therebetween to destroy said radial clearance. With the present construction, the tight fit of the retainer ring 26 within the groove 30 of the valve seat member 22 prevents leakage of combustion gases between said ring and member. Also for this purpose, the ends of each half of the two-part retainer ring 26 are formed so that, when said two-part retainer ring is shrunk into the counter-bore 18, gas tight joints are provided between the abutting ends 28 of said ring halves. In addition the outer corners 32 and 34 of the groove 30 preferably are made sharp so that any carbon deposits, which may tend to build up on the portion of the ring 26 projecting out of the groove 30, will be scraped off upon relative radial motion of the valve seat member 22 and retainer ring 26. In this way the radial clearance between the valve seat member 22 and its retainer ring 26 remains effective during engine operation.

The tight fit of the retainer ring in the valve seat member groove 30 has the further advantage in that this construction results in a good heat conducting flow path from the valve seat member 22 to its cylinder head 10, thereby helping to cool said valve seat member. Also the present construction permits the use of a retainer ring 26 of high heat conductivity thereby further helping to reduce the operating temperature of the valve seat member 22. In addition, because of a tight fit between the valve seat member 22 and retainer ring 26, some of the valve loads are transmitted from the valve seat member 22 to the cylinder head through the retainer ring 26 instead of all the loads being transmitted from the valve seat member directly to the cylinder head at the bottom 20 of the counter-bore 18.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a valve body having a fluid passage therein, an annular valve seat assembly secured to said body within said fluid passage, said assembly comprising a valve seat ring, and a retainer ring having a shrink fit with the wall of said passage for supporting said valve seat ring in said valve body, one of said rings having an annular groove which is formed by two annular axially-spaced side walls interconnected by an annular bottom wall and within which the other ring extends radially in engagement with said side walls but in radially-spaced relation with said bottom wall, said annular groove side walls each being flat and lying in a plane perpendicular to the axis of said one ring and having a sufficiently tight fit with the engaging surface of said other ring to prevent gas leakage therebetween without preventing radial movement of the valve seat ring relative to said retainer ring and valve body.

2. In a valve body having a fluid passage therein with a counterbore having an annular flat bottom surface disposed in a plane perpendicular to the axis of said counterbore, an annular valve seat assembly secured to said body within said counterbore, said assembly comprising a valve seat ring, and a retainer ring having a shrink fit with the wall of said counterbore for supporting said valve seat ring in said valve body, one of said rings having an annular flat surface fitted against the flat bottom of said counterbore and having an annular groove which is formed by two annular axially-spaced side walls interconnected by an annular bottom wall and within which the other ring extends radially in engagement with said side walls but in radially-spaced relation with said bottom wall, said annular groove side walls each being flat and lying in a plane perpendicular to the axis of said one ring and having a sufficiently tight fit with the engaging surface of said other ring to prevent gas leakage therebetween without preventing radial movement of the valve seat ring relative to said retainer ring and valve body.

3. In a valve body having a fluid passage therein, an annular valve seat assembly secured to said body within said fluid passage, said assembly comprising a valve seat ring, and a retainer ring having a shrink fit with the wall of said passage for supporting said valve seat ring in said valve body, said retainer ring comprising a plurality of individual circular segments disposed in end-to-end relation to form a complete ring encircling said valve seat ring, one of said rings having an annular groove which is formed by two annular axially-spaced side walls interconnected by an annular bottom wall and within which the other ring extends radially in engagement with said side walls but in radially-spaced relation with said bottom wall, said annular groove side walls each being flat and lying in a plane perpendicular to the axis of said one ring and having a sufficiently tight fit with the engaging surface of said other ring to prevent gas leakage therebetween without preventing radial movement of the valve seat ring relative to said retainer ring and valve body.

4. In a valve body having a fluid passage therein, an annular valve seat assembly secured to said body within said fluid passage, said assembly comprising a valve seat ring, and a retainer ring having a shrink fit with the wall of said passage for supporting said valve seat ring in said valve body, said retainer ring comprising a plurality of individual circular segments disposed in end-to-end relation to form a complete ring encircling said valve seat ring, one of said rings having an annular groove which is formed by two annular axially-spaced side walls interconnected by an annular bottom wall and within which the other ring extends radially in engagement with said side walls but in radially-spaced relation with said bottom wall, said annular groove side walls and the surfaces of said other ring engaged thereby each being flat and lying in a plane perpendicular to the axis of its ring and the fit between said side walls and said other ring being tight without preventing radial movement of the valve seat ring relative to said retainer ring and valve body.

5. In a valve body having a fluid passage therein with a counterbore having an annular flat bottom surface disposed in a plane perpendicular to the axis of said counterbore, an annular valve seat assembly secured to said body within said counterbore, said assembly comprising a valve seat ring, and a retainer ring having a shrink fit with the wall of said counterbore for supporting said valve seat ring in said valve body, said retainer ring comprising a plurality of individual circular segments disposed in end-to-end relation to form a complete ring encircling said valve seat ring, one of said rings having an annular flat surface fitted against the flat bottom of said counterbore and having an annular groove which is formed by two annular axially-spaced side walls interconnected by an annular bottom wall and within which the other ring extends radially in engagement with said side walls but in radially-spaced relation with said bottom wall, said annular groove side walls and the surfaces of said other ring engaged thereby each being flat and lying in a plane perpendicular to the axis of its ring and the fit between said side walls and said other ring being sufficiently tight to prevent gas leakage therebetween without preventing radial movement of the valve seat ring relative to said retainer ring and valve body.

6. In a valve body having a fluid passage therein with a counterbore having an annular flat bottom surface disposed in a plane perpendicular to the axis of said counterbore, an annular valve seat assembly secured to said body within said counterbore, said assembly comprising a valve seat ring, and a retainer ring having a shrink fit with the wall of said counterbore for supporting said valve seat ring in said valve body, said retainer ring comprising a plurality of individual circular segments disposed in end-to-end relation to form a complete ring encircling said valve seat ring, said valve seat ring having an annular flat surface fitted against the flat bottom of said counterbore and having an annular outwardly-facing groove which is formed by two annular axially-spaced side walls interconnected by an annular bottom wall and within which said retainer ring extends radially inwardly in engagement with said side walls but in radially-spaced relation with said bottom wall, said annular groove side wall and the surfaces of said retainer ring engaged thereby each being flat and lying in a plane perpendicular to the axis of its ring and the fit between said side walls and said retainer ring being sufficiently tight to prevent gas leakage therebetween without preventing radial movement of the valve seat ring relative to said retainer ring and valve body.

7. The combination recited in claim 6 in which the fit between said groove side walls and said retainer ring is such as results from the axial width of said retainer ring between its said flat surfaces, before said retainer ring is placed within said groove, being approximately 0.07 to 0.28 percent greater than the axial width of said groove between said flat groove side walls.

8. In a valve body having a fluid passage therein with a counterbore having an annular flat bottom surface disposed in a plane perpendicular to the axis of said counterbore, an annular valve seat assembly secured to said body within said counterbore, said assembly comprising a valve seat ring, and a retainer ring having a shrink fit with the wall of said counterbore for supporting said valve seat ring in said valve body, said retainer ring comprising a plurality of individual circular segments disposed in end-to-end relation to form a complete ring encircling said valve seat ring, said valve seat ring having an annular flat surface fitted against the flat bottom of said counterbore and having an annular outwardly-facing groove which is formed by two annular axially-spaced side walls interconnected by an annular bottom wall and within which said retainer ring extends radially inwardly in engagement with said side walls but in radially-spaced relation with said bottom wall, said annular groove side walls and the surfaces of said retainer ring engaged thereby each being flat and lying in a plane perpendicular to the axis of its ring and the fit between said side walls and said retainer ring being sufficiently tight to prevent gas leakage therebetween without preventing radial movement of the valve seat ring relative to said retainer ring and valve body and without stressing the material of said rings beyond their yield points.

9. In a valve body having a fluid passage therein with a counterbore having an annular flat bottom surface disposed in a plane perpendicular to the axis of said counterbore, an annular valve seat assembly secured to said body within said counterbore, said assembly comprising a valve seat ring, and a retainer ring having a shrink fit with the wall of said counterbore for supporting said valve seat ring in said valve body, said retainer ring comprising a plurality of individual circular segments disposed in end-to-end relation to form a complete ring encircling said valve seat ring, said valve seat ring having a flat annular surface fitted against the flat bottom of said counterbore and having an annular outwardly-facing groove which is formed by two annular axially-spaced side walls interconnected by an annular bottom wall and within which said retainer ring extends radially inwardly in engagement with said side walls but in radially-spaced relation with said bottom wall, the side walls of said groove and the annular surfaces of the retainer ring engaged thereby having a tight fit such as results from said retainer ring having a width slightly greater than the axial width of said groove before said retainer ring is placed in said groove.

GEORGE H. KELLER.

REFERENCES CITED

The following references are of record in the file of this patent:

UNITED STATES PATENTS

| Number | Name | Date |
|---|---|---|
| 1,435,029 | Stewart | Nov. 7, 1922 |
| 1,756,337 | Bowler | Apr. 29, 1930 |
| 1,891,460 | Vlahek | Dec. 20, 1932 |
| 1,949,613 | McDonald | Mar. 6, 1934 |
| 1,988,966 | Eckhouse | Jan. 22, 1935 |
| 2,035,165 | Jardine | Mar. 24, 1936 |
| 2,114,934 | Nordstrom | Apr. 19, 1938 |
| 2,179,165 | Sifkovitz | Nov. 7, 1939 |
| 2,350,905 | Koehler | June 6, 1944 |
| 2,366,520 | Griffith | Jan. 2, 1945 |
| 2,429,778 | Stancliff | Oct. 28, 1947 |